A. G. SCHERER.
ADAPTER FOR SHEET METAL PIPING.
APPLICATION FILED JULY 19, 1918.
1,280,312.
Patented Oct. 1, 1918.
2 SHEETS—SHEET 1.
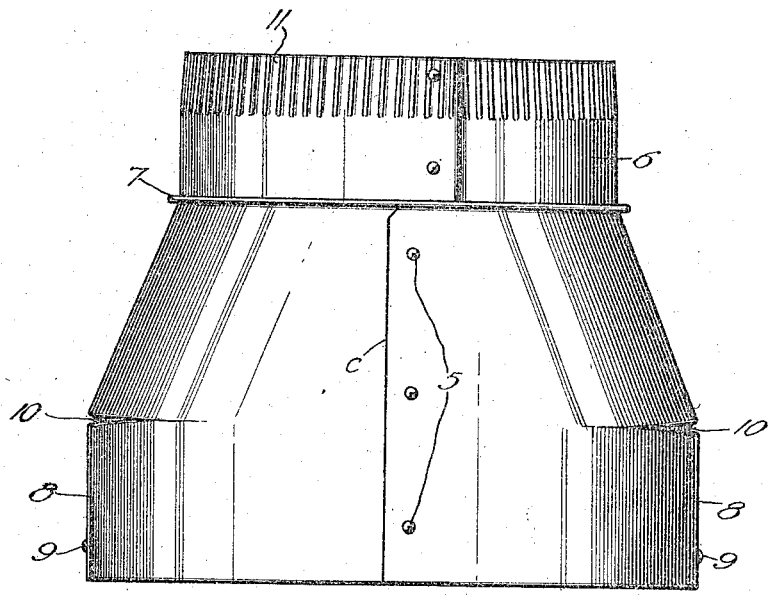
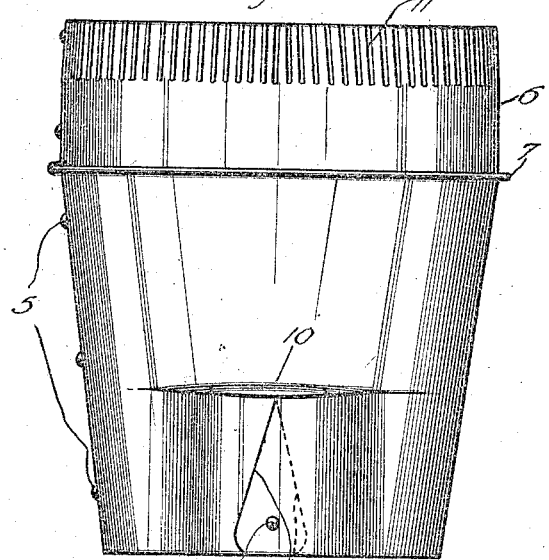

A. G. SCHERER.
ADAPTER FOR SHEET METAL PIPING.
APPLICATION FILED JULY 19, 1918.
1,280,312.
Patented Oct. 1, 1918.
2 SHEETS—SHEET 2.
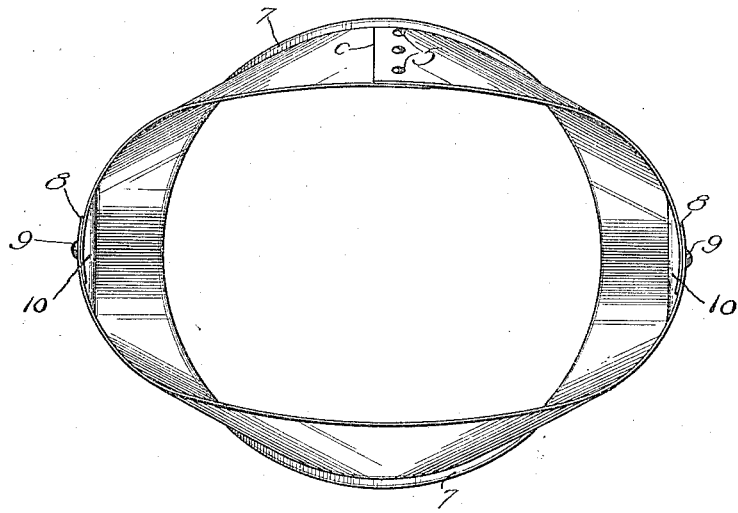
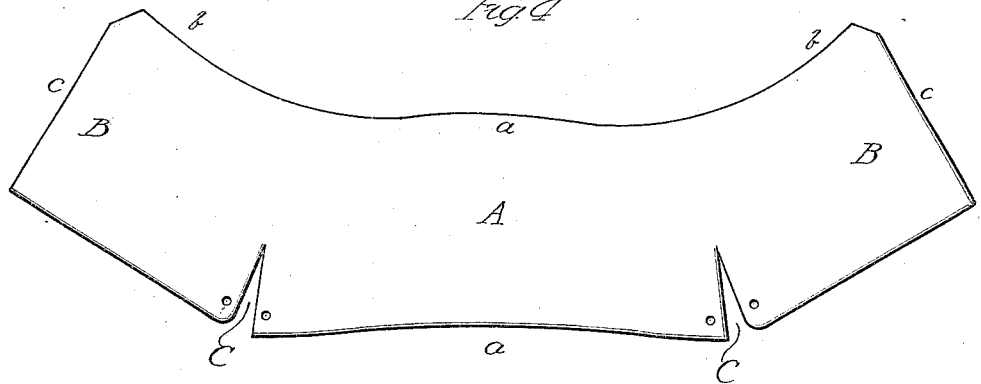

UNITED STATES PATENT OFFICE.

ALBERT G. SCHERER, OF CHICAGO, ILLINOIS, ASSIGNOR TO THE EXCELSIOR STEEL FURNACE COMPANY, OF CHICAGO, ILLINOIS, A CORPORATION OF ILLINOIS.

ADAPTER FOR SHEET-METAL PIPING.

1,280,312.     Specification of Letters Patent.      Patented Oct. 1, 1918.

Application filed July 19, 1918. Serial No. 245,708.

*To all whom it may concern:*

Be it known that I, ALBERT G. SCHERER, a citizen of the United States, and a resident of the city of Chicago, in the county of Cook and State of Illinois, have invented certain new and useful Improvements in Adapters for Sheet-Metal Piping, of which the following is a specification.

My invention relates generally to sheet metal pipe construction and more particularly to an adapter or reducer to be used in connection with stove-pipes for connecting flues of different dimensions and of the same or different cross-sectional shape; as, for instance, to connect the outlet opening in a stove, which is usually elliptical shape, with the conduit or pipe leading to the discharge opening into the chimney, or to connect sections of pipe both of circular cross-section, but of different dimensions. While my invention is especially adapted for the purposes just mentioned, it, of course, will be obvious to others that the principles are capable of being incorporated in all sheet metal pipe, such as furnace pipes, hot air conduits, and the like, without materially affecting the structure or departing from the principles involved, and such uses and such modifications as may be made are contemplated as included within the scope of my claims.

In joining a smoke pipe which is round in section to the smoke outlet of the stove, which is usually elliptical, it is the practice to simply compress or distort one end of a stove pipe until it shapes or conforms to the smoke outlet opening of the stove. A round conduit is a much more efficient conduit and after connection with the stove has been made a round pipe of smaller diameter than is necessary in making the connection can be used to advantage, thereby effecting economy of material necessary in making the joint and also an economy in the space necessary for installation which is very often of vital importance.

The principal object of my invention is the production of a device for connecting runs of pipe or an opening and a pipe of different dimensions and the same or different shapes. Devices for connecting runs of pipe of different dimensions, known as reducers, are in use, but the peculiar characteristic of my device lies in the fact that one end thereof and the tapered portion are made from a single integral piece of sheet metal which permits the end in question to be fitted to a large variety of shapes of openings, as well as fitted to pipes of round or circular section. My reducer can also be much more economically made, as the amount of work thereon is less than is required in producing such fittings of three pieces. A further object is the provision of a reducer of this character that is provided with suitable reinforcements in the shape of indentations or inturned beads, whereby the excess metal at the juncture of the tapered and straight portions is disposed of and greater rigidity is obtained; and a still further object is the provision of a suitable blank from which the lower portion of the section comprising both tapered and straight forms is fabricated out of a single integral sheet of metal.

I prefer to accomplish the divers objects of my invention substantially in the manner and by the means hereinafter fully described and as more particularly pointed out in the claims, reference being had to the accompanying drawings which form a part of this specification, wherein:—

Figure 1 is a vertical side elevation of an adapter for pipes made in accordance with the preferred form of my invention.

Fig. 2 is a vertical end view thereof.

Fig. 3 is a bottom plan of the adapter.

Fig. 4 is a plan of the blank from which the lower portion of the adapter is fabricated.

Referring more particularly to Fig. 4 of the drawing, it will be observed the blank for the lower tapered and straight portions of the adapter preferably comprises an integral flat sheet of metal, the body portion A whereof is preferably of a substantially rectangular shape, having its upper and lower edges curved slightly upwardly toward the center. The upper edge of the central rectangular blank, after describing the curves just mentioned, sweeps obliquely upwardly to provide edges *b, b* of the lateral oblique ends B, B of the blank. The lower edges of the lateral or oblique ends B, B are substantially straight and inwardly extended V-shaped notches or darts C, C are cut in a converging direction a distance slightly to correspond to the parallel portion of the tapered section.

In assembling the reducer, or, in other words, forcing the structure above described, the end edges c, c are brought together and secured by means of rivets 5 and a cylindrical shaped short piece or collar 6 is secured to the upper edge of this blank by an outwardly extended bur or rib 7, extending around the blank and a coöperating groove or bead in the edge of the collar. The darts C, C are now closed by overlapping the edges thereof, as shown at 8 in Figs. 2 and 3, and securing them in place by rivets 9, so as to render the walls of this part of the section parallel instead of tapered. The lower portion of this member may now be compressed to form the elliptical outline shown in detail in Fig. 3 of the drawings, to permit its lower edge to fit the elliptical-shaped opening for the smoke flue; or it may be pressed into a round section. In order to dispose of the metal which would otherwise form a prominence at the apexes of the darts where the conical and cylindrical forms join, and also to reinforce the portion of the structure at these points, I provide inturned beads or channels 10, 10 in the opposite end walls of the lower adapter section just at the apexes of the darts. These beads or channels extend partly around the end portions of the structure, as illustrated, and considerably strengthen, as well as shape up the side-walls of the device and prevent buckling or caving in when subjected to unusual strain or torsions. As will be seen, the cylindrical upper section of the structure is provided with fluting or ribbing 11 to permit its easy entry into the usual cylindrical sections of pipe which frictionally engage and closely fit over the uncorrugated lower portion of the collar and abut and are securely held in place upon the shoulder formed by the seam 7.

It will now be apparent from the foregoing description, taken in connection with the illustrative drawings, that I have provided a simple and economically made structure for joining flues or any sheet-metal conduit of different dimensions and of the same or varying cross-sectional form.

What I claim is:—

1. A sheet metal pipe fitting comprising a member of suitable form to produce a tapered conduit, one edge of said member being slit and overlapped thereby causing the portions of the walls between said slits to be disposed parallel.

2. A sheet metal pipe fitting comprising a member of suitable form to produce a tapered conduit, one edge of said member being slit and overlapped thereby causing the portions of the walls between said slits to be disposed parallel and segmental inturned grooves disposed at the inner ends and transversely to said slits.

3. A reducer for sheet metal conduit comprising a cylindrical collar, and a tapered section secured thereto, the end of said tapered section opposite said cylindrical collar having the metal thereof displaced whereby the opposite walls of said end are brought into substantial parallelism.

4. A reducer for sheet metal conduit comprising a cylindrical collar, and a tapered section secured thereto, the end of said tapered section opposite said cylindrical collar having the metal thereof displaced whereby the opposite walls of said end are brought into substantial parallelism and segmental inturned grooves disposed oppositely with respect to each other at the juncture between the tapered and parallel portions.

5. A blank for sheet metal pipe fitting comprising a substantially rectangular central portion having obliquely disposed ends and darts located at the salient corners between said central portion and said ends.

Signed at Chicago, county of Cook, and State of Illinois, this 1st day of July, 1918.

ALBERT G. SCHERER.

Witnesses:
BENJ. T. ROODHOUSE,
H. SLACK.